Nov. 15, 1949  H. J. FINDLEY  2,488,278
HEATING AND VENTILATING DEVICE FOR VEHICLES
Filed Nov. 1, 1944  2 Sheets-Sheet 2
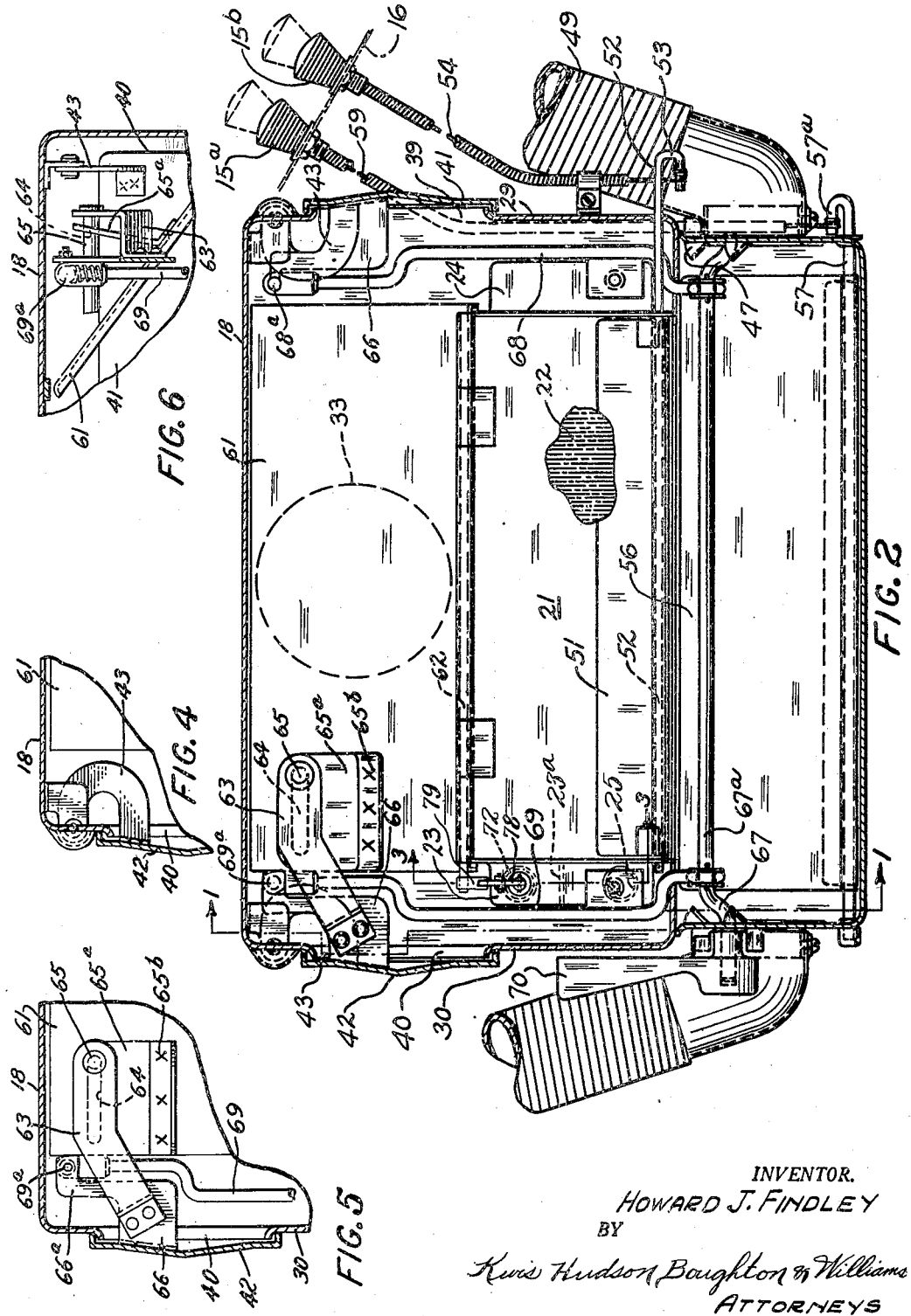
INVENTOR.
HOWARD J. FINDLEY
BY
Kwis Hudson Boughton & Williams
ATTORNEYS Patented Nov. 15, 1949

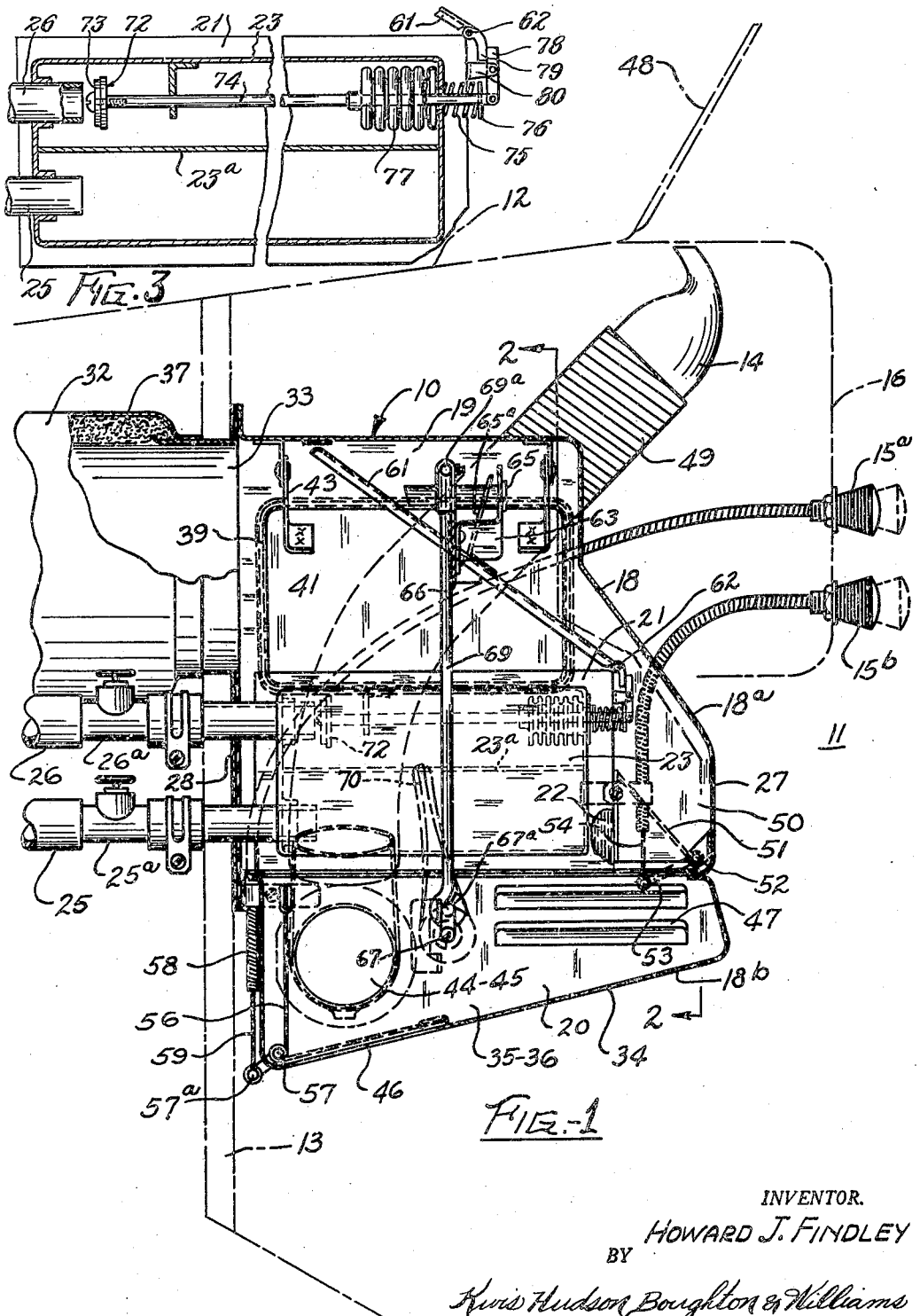

2,488,278

UNITED STATES PATENT OFFICE 2,488,278

HEATING AND VENTILATING DEVICE FOR VEHICLES

Howard J. Findley, Chardon, Ohio, assignor to Eaton Manufacturing Company, Cleveland, Ohio, a corporation of Ohio Application November 1, 1944, Serial No. 561,387

7 Claims. (Cl. 98—2)

This invention relates to heating and ventilating devices for vehicles and aims to provide an improved device of this kind which is of a simple and compact construction and which affords a flexibility of operation such that varying conditions or seasonal changes requiring different amounts of heated and unheated air can be readily met.

Another object of this invention is to provide an improved device of this character, embodying a novel means by which the delivery of either heated or unheated air in a vehicle compartment can be readily controlled as may be desired for meeting seasonal changes and comfort requirements of the occupants.

A further object of the present invention is to provide an improved heating and ventilating device of the kind employing a heat-exchange element or core, and having novel means for controlling the flow or distribution of the air supplied to the device so that the air can be delivered in either a heated or unheated condition or as a mixture of heated and unheated air.

Still another object of this invention is to provide an improved heating and ventilating device of the character mentioned, having a delivery outlet for unheated air and a cover for the core which is movable to open or closed positions substantially simultaneously with the actuation of a member controlling such delivery outlet.

The present invention also provides an improved vehicle heating and ventilating device of this character in which the supply of medium to the heat-exchange element or core is controlled automatically in response to the actuation of the means by which the device is converted from a warm weather operating condition to a cold weather operating condition or vice versa.

The invention can be further briefly summarized as consisting in certain novel combinations and arrangements of parts hereinafter described and partially set out in the appended claims.

In the accompanying sheets of drawings,

Fig. 1 is a vertical sectional view of a heating and ventilating device embodying the present invention and showing the relative location of the device in a vehicle, the view being taken substantially on line 1—1 of Fig. 2.

Fig. 2 is another vertical sectional view of the device taken substantially on line 2—2 of Fig. 1.

Fig. 3 is a detail sectional view taken as indicated by line 3—3 of Fig. 2.

Figs. 4 and 5 are fragmentary sectional views corresponding with portions of the main sectional elevation of Fig. 2 but further illustrating certain of the details relating to the mounting and actuation of the air flow control members; and Fig. 6 is a fragmentary sectional view corresponding with a portion of the main sectional elevation of Fig. 1 but further illustrating certain of the details relating to the actuation of the air flow control members.

Proceeding now with a more detailed description of this invention, the drawings show the improved heating and ventilating device in a form of a self-contained unit 10 adapted to be installed in the vehicle compartment which is to be heated and ventilated. The device 10 can be either initially installed in the vehicle 12 as original equipment or subsequently installed as an accessory, and as here shown, is preferably located in the driver's compartment 11. The device 10 can be mounted on the dashboard 13 so that its windshield defrosting outlets 14 and its control members 15a and 15b can be conveniently extended to the instrument panel 16.

The device 10 comprises, in general, a housing 18 provided with air inlet and delivery chambers 19 and 20 and a heat-exchange element 21 located in the housing between such inlet and delivery chambers. The element 21 is preferably in the form of a core having numerous air passages 22 through which air can flow from the inlet chamber 19 to the delivery chamber 20. The core 21 also has tanks 23 and 24 at its opposite ends and a pair of pipes or conduits 25 and 26 connected with the tank 23 on opposite sides of the partition 23a for circulating heating medium, such as hot water from the engine cooling system of the vehicle, in a double pass through the core. The conduits 25 and 26 have suitable manually operable shut-off valves 25a and 26a therein which permit the heating medium to the core to be shut off whenever desired. One of the conduits, in this instance the conduit 26, is also provided with an automatic control valve 72 which will be described in detail hereinafter.

The housing 18 may be constructed of sheet metal or other suitable material and comprises a main section 18a in which the core 21 and the inlet chamber 19 are located and a section 18b in which the delivery chamber 20 is located. The main housing section 18a has front and back walls 27 and 28 and a pair of laterally spaced end walls 29 and 30. The air inlet chamber 19 is located above the core 21 and is adapted to be supplied with unheated air by means of a pipe or conduit 32 which connects with the chamber 19 through an opening 33 in the rear wall 28. The housing section 18b forms the lower portion of the device and has a bottom wall 34 and a pair of laterally spaced end walls 35 and 36 defining the delivery chamber 20 which is located below the core 21. The air which is supplied to the inlet chamber 19 may be fresh or unheated air which is forced into this chamber in large volume through the pipe 32 by a blower or air scoop as shown in my copending application, Serial No. 544,295, filed July 10, 1944, now abandoned. The pipe 32 may have a lining 37 of sound absorbing material therein for removing objectionable noises from the air being supplied.

For a purpose to be more fully explained hereinafter, the air inlet chamber 19 is provided with one or more delivery openings, in this instance, two such openings 39 and 40 located in the end walls 29 and 30 of the housing. The delivery openings 39 and 40 are controlled by closure members or covers 41 and 42 which are adapted to be moved to an opened or closed position. The covers 41 and 42 are mounted on the housing 18 for outward swinging movement by means of the curved hinge arms 43. The delivery chamber 20 is also provided with delivery openings 44 and 45 in the end walls 35 and 36 thereof and a delivery opening 46 in the bottom wall 34. Louvered openings 47 can also be provided, if desired or needed, in one or more of the walls of the chamber 20.

The openings 44, 45 and 46 of the chamber 20 are for the delivery of heated or partially heated air from the device. The openings 44 and 45 deliver air which, in this instance, is used for defrosting the windshield 48 of the vehicle, and to this end the defrosting outlets or nozzles 14 are located adjacent to the base of the windshield and are connected with the openings 44 and 45 by flexible conduits 49. The outlet 46 located in the bottom wall 34 opens directly into the vehicle compartment 11.

To provide for a flow of air from the inlet chamber 19 to the delivery chamber 20 without passage through the core 21, the housing 18 is constructed with a by-pass 50 therein. The by-pass 50 comprises a space or passage extending around the core 21 just inside the front wall 27 of the housing and which connects the inlet chamber 19 directly with the delivery chamber 20. This by-pass is controlled by a valve 51 which is pivoted on the front wall of the housing as indicated at 52, and is adapted to be swung from the closed position shown in the drawing to an open position, by means of the actuating knob 15b located on the instrument panel 16. The valve 51 has an actuating arm or lever 53 with which the control knob 15b is connected by means of the Bowden wire 54.

The delivery opening 46 provided in the bottom wall 34 of the delivery chamber 20 is controlled by a movable valve or door 56 which is carried by a pivoted rock shaft 57 and is adapted to be swung to the dotted line closed position shown in Fig. 1. The valve 56 can be closed or can be opened to its full line position by means of the control knob 15a which is connected with an arm portion 57a of the pivoted shaft 57 by means of a Bowden wire 59 extending through a guide tube 58.

During operation of the vehicle 12 in cool or winter weather, it is desirable that the major portion of the air delivered to the chamber 19 pass through the core 21 so as to be heated thereby. The air heated by the core 21 flows into the delivery chamber 20 from which it is discharged either into the vehicle compartment 11 directly through the opening 46, or through the defrosting nozzles 14 located adjacent the windshield 48. If a large amount of heated air is needed for windshield clearing purposes, the valve 56 is moved to its closed position so that substantially all of the heated air is discharged from the chamber 20 through the defrosting outlets 44 and 45. On the other hand, if the windshield does not require clearing, the valve 56 is moved to its open position and the major portion of the heated air will be discharged directly through the opening 46 and only a relatively small portion will be discharged through the defrosting outlets. The temperature of the heated air being delivered through the opening 46 or through the defrosting outlets 44 and 45 can be regulated and varied by mixing unheated air with the heated air prior to discharge from the chamber 20. The unheated air for this mixing purpose is supplied to the chamber 20 through the by-pass 50 which is controlled by movement of the valve 51 as described above.

During the operation of the vehicle 12 in warm or summer weather, it is desirable to prevent the air which is supplied to the chamber 19 from passing through the core 21 so that substantially all of the air can be discharged from the chamber 19 in an unheated condition through the delivery openings 39 and 40. This provides for the delivery of a large volume of relatively cool air directly into the vehicle compartment 11 for cooling and ventilating the same. To prevent the passage of the air through the core 21 under these circumstances, a valve or cover 61 is provided in the chamber 19 and is movable from its full line open position shown in Fig. 1, to a closed position lying closely adjacent to the upper face of the core. The cover 61 is carried by a shaft or pin 62 which is pivotedly mounted on the core 21 adjacent the front upper edge thereof.

It is desirable that the cover 61 be shifted from its open to its closed position substantially simultaneously with the opening of the control doors 41 and 42, and vice versa. This can be accomplished by means of an operating connection between the cover 61 and one of the control doors, in this instance, the door 42. This operating connection comprises an arm 63 connected with the door 42 and carrying a pin 65, and a bracket 65a connected with the cover 61 by the spot welding 65b and having a slot 64 in which the pin is slidable. The pin 65 is fixed in the end portion of the arm 63 as by means of a head provided on the pin and welded or otherwise connected to this arm. The stem portion of the pin 65 extends through the slot 64 of the bracket 65a and is of a length such that it will remain engaged in the slot for all positions to which the cover 61 is moved.

When the control door 42 is swung to its open position, the arm 63 swings downwardly carrying the pin 65 with it. During such downward movement, the pin 65 acts on the bracket 65a to shift or lower the cover 61 to a closed position overlying the upper face of the core 21 so as to prevent the passage of air through the latter. When the door 42 is swung to its closed position the reverse of this action takes place, that is to say, the arm 63 acting through the pin 65 and the bracket 65a swings or lifts the cover 61 to its full line open position shown in Fig. 1 so as to again permit the passage of air downwardly through the core 21.

As shown in the drawings, the arm 63 can be connected with the door 42 by having one end thereof riveted to a bracket 66 which, in turn, is welded or otherwise connected to the door 42.

The actuation described above for the doors 41 and 42 and the cover 61 can be obtained by the use of any suitable linkage or mechanism. In this instance, I show a rock shaft 67 pivotally supported by the end walls 35 and 36 of the delivery chamber portion of the housing 18, and having an offset or crank portion 67a connected with the doors 41 and 42 by means of vertical rods or links 68 and 69 located adjacent the respective end walls 29 and 30. The rock shaft 67 is provided at one end thereof with an actuating lever 70 by which this shaft can be rocked from a winter position in which the doors 41 and 42 are closed to a summer position in which these doors are open. The upper ends of the links 68 and 69 are operably connected with the doors 41 and 42 by being pivotally attached to the angular extension portions 66a (see Fig. 6) of the brackets 66 which are mounted on these doors. The pivotal connections provided at these points can be conveniently formed by the use of elements which form ball and socket joints 68a and 69a of a conventional form.

When weather conditions are such that it is desirable to operate the device with the cover 61 in a closed position overlying the core 21 as explained above, it is also desirable that the supply of heating medium to the core be shut off so that there will be no opportunity for the core to give off heat in the vehicle compartment. For this purpose I provide the valve 72 which is located in the tank 23 and by which the conduit 26 is automatically closed when the cover 61 is lowered and vice versa, is opened when the cover is lifted.

As shown in Fig. 3 the valve 72 includes a valve element 73 which is carried by an actuating rod 74 and is adapted to seat against the inner end of the conduit 26. A compression spring 75 disposed around the rod and engaging the pin 76 urges the valve toward its open position. The outer end of the rod 74 projects from the tank through a flexible member or bellows 77 which prevents leakage at this point. The rod 74 is actuated in a direction to close the valve 73 by means of a lever 78 and a cam 79, the latter being carried by one end of the shaft 62 on which the cover 61 is mounted. The lever 78 is pivotally connected with the outer end of the rod 74 and is fulcrumed at an intermediate point on the supporting bracket 80 so that when the cover 61 is lowered by actuation of the lever 70 the cam 79 will rock the lever 78 to cause closing of the valve 72 by the rod 74. When the cover 61 is lifted, the cam 79 releases the lever 78 so as to permit the spring 75 to open the valve 73.

Although in describing my improved heating and ventilating device I have spoken of "unheated" air being supplied to the chamber 19, it should be understood that this term is used in a relative sense because the air supplied to this chamber could be recirculated air and in that case would be partially heated. Likewise, it should be understood that although the core 21 has been described as being used for heating the air, this core could also be used to cool the air in which case a cooling or refrigerating medium would be supplied thereto through the conduits 25 and 26 instead of a heating medium.

From the foregoing description and the accompanying drawings, it will now be readily understood that the present invention provides an improved heating and ventilating device by which heated or unheated air can be supplied to a compartment of the vehicle in accordance with seasonal changes and the comfort requirements of the occupants. It will be seen furthermore that the improved device is in the form of a compact self-contained unit and has a flexibility of operation which permits the same to be quickly and easily adjusted to convert the same from a summer condition to a winter condition or vice versa.

While I have illustrated and described my improved heating and ventilating device in considerable detail, it will be understood of course that I do not wish to be correspondingly limited but regard my invention as including all changes and modifications coming within the scope of the appended claims.

Having thus described my invention, what I claim is:

1. In an air heating device of the character described, a housing having a heat-exchange element therein and chambers on opposite sides of said element, means for supplying unheated air to one of said chambers, the other of said chambers having an outlet for the delivery of air which has been heated by said element, said housing having walls including a pair of opposed walls provided with outlets communicating with said one chamber for the delivery of streams of unheated air therefrom, movable doors controlling the outlets of said opposed walls, a shaft extending transversely of said housing and supported for rocking movement by said opposed walls, said shaft having eccentric actuating means thereon, and links lying adjacent said opposed walls and connecting said doors with the eccentric means of said shaft so that rocking of said shaft will cause closing or opening of said doors.

2. In an air heating device of the character described, a housing having therein a heat-exchange element provided with a plurality of air passages and chambers on opposite sides of said element and connected by the passages of the latter, means for supplying unheated air to one of said chambers, the other of said chambers having an outlet for the delivery of air which has been heated by said element, said housing having walls including a pair of opposed walls provided with outlets communicating with said one chamber for the delivery of streams of unheated air therefrom, movable doors controlling the outlets of said opposed walls, a cover in said housing and extending over said element and movable relative to the adjacent face of the latter for controlling the flow of air therethrough, a shaft extending transversely of said housing and supported for rocking movement by said opposed walls, means connecting said doors with said shaft for actuation thereby, and motion transmitting means operably connecting said cover with one of said doors so that said cover will be moved to close the passages of said element substantially simultaneously with the movement of said doors to their open position and vice versa.

3. In an air heating device of the character described, a housing having therein a heat-exchange element provided with a plurality of air passages and chambers on opposite sides of said element and connected by the passages of the latter, means for supplying unheated air to one of said chambers, the other of said chambers having an outlet for the delivery of air which has been heated by said element, said housing having walls including a pair of opposed walls provided with outlets communicating with said one chamber for the delivery of streams of unheated air therefrom, movable doors controlling the outlets of said opposed walls, a cover in said housing and extending over said element and movable relative to the adjacent face of the latter for controlling the flow of air therethrough, a shaft extending transversely of said housing and supported for rocking movement by said opposed walls, means connecting said doors with said shaft for actuation thereby, brackets connected with said cover and one of said doors and extending into adjacent relation to each other, and means carried by said brackets and forming a pin and slot connection between said cover and said one door so that said cover will be moved to close the passages of said element substantially simultaneously with the movement of said doors to their open position and vice versa.

4. In a vehicle heater, a heat-exchange core having passages for air to be heated, means for supplying air to be heated to said core including a member controlling the flow of air through said passages and being movable to open and closed positions, a conduit for supplying heating medium to said core, a valve controlling said conduit, and actuating means operably connecting said valve with the movable member such as to cause closing of said valve substantially simultaneously with the closing of said member and opening of said valve substantially simultaneously with the opening of said member, said actuating means including a spring adapted to impart movement to said valve in one direction and thrust-transmitting means adapted to impart movement to said valve in the opposite direction and in opposition to said spring.

5. A vehicle heater comprising a housing having an inlet chamber adapted to be supplied with unheated air and also having a delivery outlet for heated air, a heat-exchange core disposed in said housing and extending thereacross between said inlet chamber and said delivery outlet, said core having air passages extending therethrough and adapted to receive air from said inlet chamber, a cover in said housing in overlying cooperation with the side of the core which is presented to said inlet chamber, said cover being movable toward and from said core to open and closed positions for controlling the flow of air therethrough, a conduit extending into said housing and connected with said core for supplying heating medium thereto, a valve located in said housing and controlling said conduits, actuating means operably connected with said cover for moving the same to open and closed positions, and actuating means inter-connecting said cover with said valve for actuation of the latter in response to actuation of the cover such that opening of said cover will cause opening of said valve and closing of the cover will cause closing of the valve.

6. A vehicle heater as defined in claim 5 in which said inlet chamber has a delivery opening for unheated air and in which a movable member controls said delivery opening for unheated air and is adapted to be moved to open and closed positions.

7. A vehicle heater comprising a housing having an inlet chamber adapted to be supplied with unheated air and also having a delivery outlet for heated air, a heat-exchange core disposed in said housing and extending thereacross between said inlet chamber and said delivery outlet, said core having air passages extending therethrough and adapted to receive air from said inlet chamber, said inlet chamber having a delivery opening for unheated air and said housing having a movable door controlling said delivery opening, a cover in said housing in overlying cooperation with the side of the core which is presented to said inlet chamber, said cover being movable toward and from said core to open and closed positions for controlling the flow of air therethrough, actuating means connected with said door for moving the same to open and closed positions, actuating means operably connecting said cover with said door for actuation thereby such that movement of the door to open position causes closing of the cover and movement of the door to closed position causes opening of the cover, a conduit extending into said housing and connected with said core for supplying heating medium thereto, a valve located in said housing and controlling said conduit, and actuating means interconnecting said cover with said valve for actuation of the latter in response to actuation of the cover such that opening of said cover will cause opening of said valve and closing of the cover will cause closing of the valve.

HOWARD J. FINDLEY.

REFERENCES CITED

The following references are of record in the file of this patent:

UNITED STATES PATENTS

| Number | Name | Date |
|---|---|---|
| 2,026,929 | Backe | Jan. 7, 1936 |
| 2,213,018 | Perkins | Aug. 27, 1940 |
| 2,235,642 | Lintern et al. | Mar. 18, 1941 |
| 2,264,848 | Kahl | Dec. 2, 1941 |
| 2,291,543 | Findley | July 28, 1942 |
| 2,295,750 | Norris et al. | Sept. 15, 1942 |
| 2,304,643 | Hans | Dec. 8, 1942 |
| 2,309,202 | Moore | Jan. 26, 1943 |
| 2,332,707 | Findley | Oct. 26, 1943 |
| 2,355,151 | Findley | Aug. 8, 1944 |